(12) United States Patent
Arefeen

(10) Patent No.: US 12,081,153 B2
(45) Date of Patent: *Sep. 3, 2024

(54) METHOD AND APPARATUS FOR RIDING THROUGH POWER DISRUPTIONS OF A DRIVE CIRCUIT

(71) Applicant: Weatherford Technology Holdings, LLC, Houston, TX (US)

(72) Inventor: Mohammed S. Arefeen, Houston, TX (US)

(73) Assignee: Weatherford Technology Holdings, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/222,643

(22) Filed: Jul. 17, 2023

(65) Prior Publication Data

US 2023/0361711 A1 Nov. 9, 2023

Related U.S. Application Data

(63) Continuation of application No. 17/813,703, filed on Jul. 20, 2022, now Pat. No. 11,799,410, which is a continuation of application No. 17/090,100, filed on Nov. 5, 2020, now Pat. No. 11,424,709.

(51) Int. Cl.
*H02P 6/30* (2016.01)
*H02J 7/00* (2006.01)
*H02P 27/06* (2006.01)

(52) U.S. Cl.
CPC ............ *H02P 27/06* (2013.01); *H02J 7/0063* (2013.01)

(58) Field of Classification Search
CPC ....... H02P 27/06; H02J 7/0063; H02M 1/322; H02M 5/458; H02M 1/0096
See application file for complete search history.

(56) References Cited

U.S. PATENT DOCUMENTS

| | | | |
|---|---|---|---|
| 4,263,535 A | 4/1981 | Jones | |
| 7,607,896 B2 | 10/2009 | Leuthen et al. | |
| 2005/0151377 A1 | 7/2005 | Ichinose et al. | |
| 2007/0263331 A1 | 11/2007 | Leuthen et al. | |
| 2014/0015322 A1* | 1/2014 | Milavec | H02M 3/155 307/52 |
| 2014/0339991 A1* | 11/2014 | Zhang | G09G 3/3406 315/186 |
| 2015/0219378 A1 | 8/2015 | Crane et al. | |
| 2016/0248340 A1* | 8/2016 | Deboy | H02M 1/08 |
| 2016/0359439 A1* | 12/2016 | Sun | H02K 11/33 |
| 2017/0063280 A1 | 3/2017 | Li et al. | |
| 2017/0329377 A1 | 11/2017 | Varma et al. | |
| 2019/0036343 A1 | 1/2019 | Nelson et al. | |
| 2019/0078572 A1 | 3/2019 | Sewell | |
| 2019/0181857 A1 | 6/2019 | Caiafa et al. | |
| 2019/0363654 A1 | 11/2019 | Pendray et al. | |
| 2020/0091722 A1 | 3/2020 | Mcdaniel et al. | |

* cited by examiner

*Primary Examiner* — Muhammad S Islam
(74) *Attorney, Agent, or Firm* — Cabello Hall Zinda, PLLC

(57) ABSTRACT

An electrical ride-through (ERT) unit is configured to apply a voltage to a drive circuit during disruptions of line voltage to the drive circuit. The ERT unit includes a capacitor on an ERT circuit that is prevented from applying the voltage to the drive circuit during normal operation of the drive circuit and applies the voltage to the drive circuit during a voltage drop on the drive circuit.

20 Claims, 4 Drawing Sheets

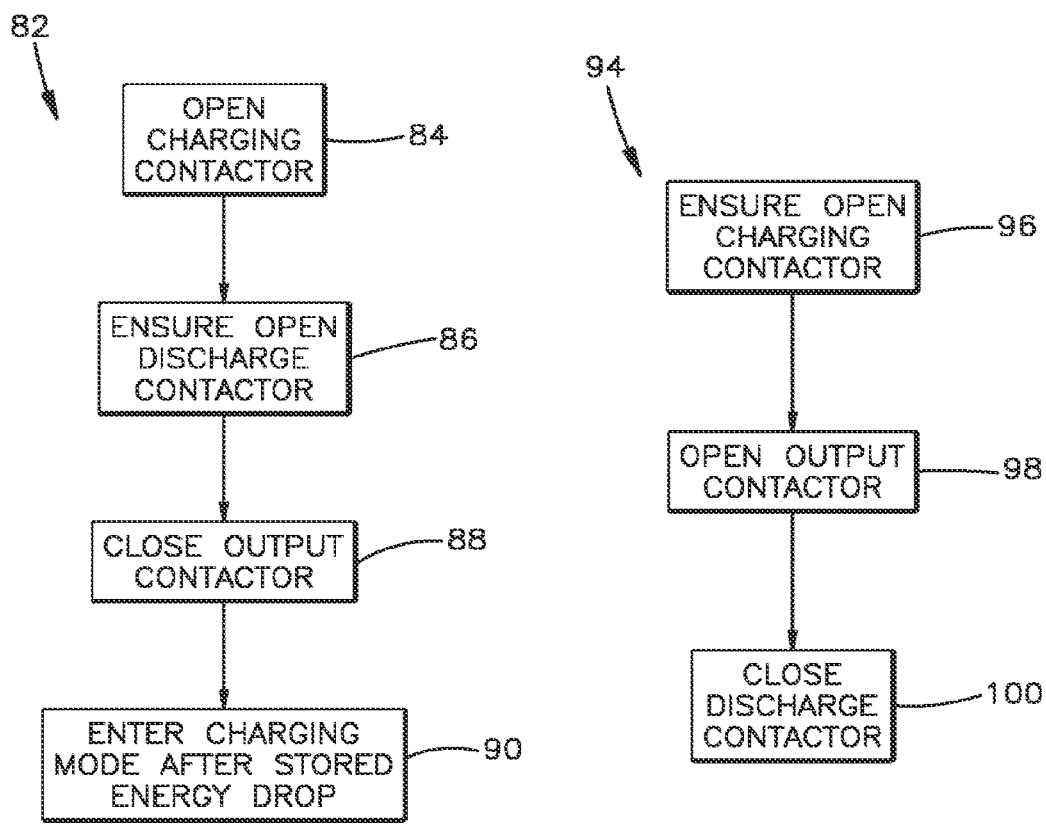

METHOD AND APPARATUS FOR RIDING THROUGH POWER DISRUPTIONS OF A DRIVE CIRCUIT

CROSS-REFERENCE TO RELATED APPLICATIONS

This is a continuation of U.S. application Ser. No. 17/813,703 filed Jul. 20, 2022, which is a continuation of U.S. patent application Ser. No. 17/090,100 filed Nov. 5, 2020—now U.S. Pat. No. 11,424,709, the disclosures of which are hereby incorporated by reference as if set forth in their entireties herein.

BACKGROUND

Electrical drives often draw electrical power from the electrical grid of the local electric utility or power supplier to drive any electrical device as desired. Some applications achieve benefits when the electrical drive is configured as a variable speed drive (VSD), including electrical submersible pumps (ESP) and saltwater disposal (SWD) among other industrial applications.

Disruptions in line voltage to the drive can cause the electrically powered device to cease operation. This decreases production efficiency, and also requires the pump to be restarted, which is often difficult. For instance, when an ESP is shut down, sand and other sediment can accumulate in the downhole pump which can get stuck, thereby increasing the difficulty of restarting the ESP. Disruptions in the line voltage can be in the form of a power outage or a voltage sag. Voltage stops occur when voltage is no longer delivered to the drive. When voltage sags occur, the DC bus voltage on the drive will oscillate, which the controller can interpret as a phase loss in the input line and discontinue operation of the pump. Further, the drive can also include a control power transformer that receives line voltage and powers auxiliary electrical components of the drive, such as the controller and contactors, and the like. A voltage sag or voltage stop on one of the lines to the control power transformer can cause a decreased voltage supply to the control power transformer, which can cause the controller to shut down the pump.

A need currently exists for a system that reliably provides electrical power to drives that are used to control a load, such as an ESP or other suitable device as desired, during disruptions in the electrical power supply to the drive.

SUMMARY

In one aspect of the present disclosure, an electrical ride-through (ERT) unit is configured to apply a voltage to a drive system during a disruption of line voltage input to the drive circuit. The ERT unit can include an energy storage section connected between positive and negative lines of an ERT circuit, the storage section configured to selectively store and discharge energy. The ERT unit can also include an output diode on the positive line of the ERT circuit, wherein the positive line is configured to connect to a positive line of a drive circuit of the drive system, such that the diode is disposed between the storage section and the positive line of drive circuit. The output diode can be configured to prevent electrical current from flowing from the storage section to the drive circuit when a voltage level on the drive circuit is greater than the voltage level of the storage section. The output diode can be configured to permit current to flow from the storage section to the drive circuit when the voltage level on the drive circuit is less than the voltage level of the storage section.

BRIEF DESCRIPTION OF THE DRAWINGS

The foregoing summary, as well as the following detailed description of illustrative embodiments of the intervertebral implant of the present application, will be better understood when read in conjunction with the appended drawings. For the purposes of examples of the present disclosure, there is shown in the drawings illustrative embodiments. It should be understood, however, that the application is not limited to the precise arrangements and instrumentalities shown. In the drawings:

FIG. 4C is a flowchart showing steps associated with a ride-through mode of the electrical ride-through unit; and FIG. 4D is a flowchart showing steps associated with a discharge mode of the electrical ride-through unit.

DETAILED DESCRIPTION

The present disclosure can be understood more readily by reference to the following detailed description taken in connection with the accompanying figures and examples, which form a part of this disclosure. It is to be understood that this disclosure is not limited to the specific devices, methods, applications, conditions, or parameters described and/or shown herein, and that the terminology used herein is for the purpose of describing particular embodiments by way of example only and is not intended to be limiting of the scope of the present disclosure. Also, as used in the specification including the appended claims, the singular forms "a," "an," and "the" include "at least one" and a plurality. Further, reference to a plurality as used in the specification including the appended claims includes the singular "a," "an," "one," and "the," and further includes "at least one." Further still, reference to a particular numerical value in the specification including the appended claims includes at least that particular value, unless the context clearly dictates otherwise.

The term "plurality", as used herein, means more than one. When a range of values is expressed, another example includes from the one particular value and/or to the other particular value. Similarly, when values are expressed as approximations, by use of the antecedent "about," it will be understood that the particular value forms another example. All ranges are inclusive and combinable.

The term "substantially," "approximately," and derivatives thereof, and words of similar import, when used to described sizes, shapes, spatial relationships, distances, directions, and other similar parameters includes the stated parameter in addition to a range up to 10% more and up to 10% less than the stated parameter, including up to 5% more and up to 5% less, including up to 3% more and up to 3% less, including up to 1% more and up to 1% less.

Figure 1:
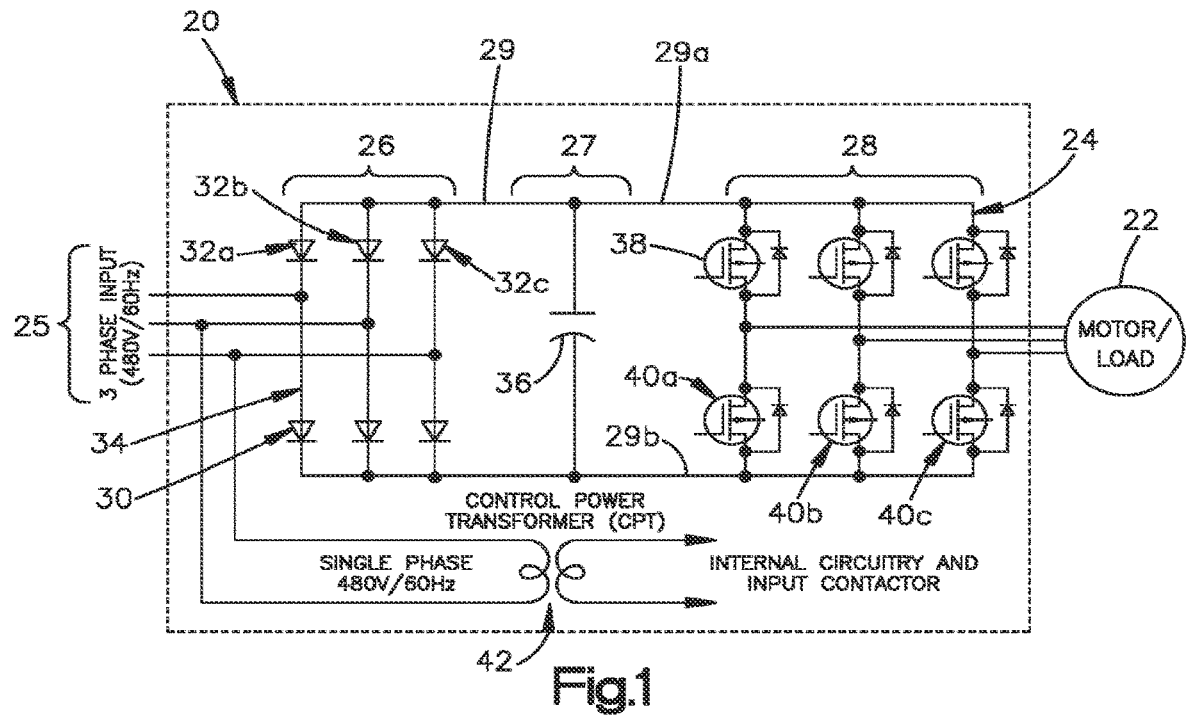
FIG. 1 is a circuit schematic diagram of a conventional variable speed drive that controls electrical power to a load, such as an ESP.

Referring to FIG. 1, a variable speed drive (VSD) system 20 can include a load 22 and a VSD circuit 24 that is configured to condition input electrical power and deliver power to a motor of the load 22. In one example, the load 22 can be configured as a motor of an electrically powered device. The electrically powered device can be a device that undergoes reciprocating or rotatable motion, such as a submersible pump jack, though the electrically powered device can undergo any motion as desired. It should be recognized, of course, that the load 22 can be alternatively configured as desired. Aspects of the present disclosure have particular applicability to loads that are susceptible to timely and costly restarts in response to ride-through events such as momentary disruptions in the power supply (either due to a voltage stop or a voltage sag in the line voltage to the VSD circuit 24) and the like.

The VSD circuit 24 includes a common VSD DC bus 29 having a positive line 29a and a negative line 29b, a VSD alternating current (AC) to direct current (DC) converter section 26 on the DC bus 29, a VSD storage section 27 on the DC bus 29, and a VSD inverter section 28 on the DC bus 29. The load 22 receives electrical power from a three-line output of the VSD inverter section 28. The DC bus 29 thus places the converter section 26, the VSD storage section 27, and the VSD inverter section 28 in electrical communication with each other. In one example, the VSD storage section 27 and the inverter section 28 can be connected in series with the VSD converter section 26. The VSD converter section 26 is configured to receive 3-phase electrical power along three respective lines (also referred to herein as line voltage) from any suitable power source 25. The power source 25 can be provided as the electrical power grid, or any suitable alternative power source as desired. The input line voltage can be a typical 480 volt (V) three phase input, in particular when the power source 25 is defined by the electrical power grid. In one example, the converter section 26 can include a plurality of diodes 30 that are arranged as pairs of diodes that are connected between the positive and negative lines 29a-b of the DC bus 29, such that the pairs are connected in parallel with each other. The diodes 30 of each pair of diodes can include first and second diodes 30 that are connected in series with each other between the positive and negative lines 29a and 29b. The diodes 30 of each pair of diodes are forward biased in the same direction from the positive line 29a to the negative line 29b. The AC to DC converter section 26 can include three pairs 32a, 32b, and 32c of diodes 30. Each of the pairs 32a, 32b, and 32c are connected in parallel. Further, the diodes 30 of each of the pairs 32a, 32b, and 32c are forward biased in the same direction. Each of the pairs 32a, 32b, and 32c is connected to a respective one line, and thus a respective one phase, of the 3-phase input. In this manner, the diodes 30 are arranged as a diode bridge 34 that rectifies the voltage received from the AC power source 25, and outputs a single-phase DC bus voltage to the DC bus 29.

The VSD storage section 27 can further include a VSD capacitor bank 36 that is connected to the DC bus 29 from the positive line 29a to the negative line 29 in parallel with the VSD converter section 26. The VSD capacitor bank 36 is configured to receive and store the single-phase DC bus voltage output from the VSD converter section 26. The VSD capacitor bank 36 can be provided as a single DC capacitor or a plurality of DC capacitors as desired. The single-phase DC bus voltage from the VSD converter section 26 charges the VSD capacitor bank 36 to a desired voltage. The VSD capacitor bank 36 can have any suitable capacitance as desired. In one example, the capacitance is in a range from approximately 10,000 microfarad (mfd) to approximately 30,000 mfd. In general, the capacitance is related to the peak current that is to be supplied to the motor of the load 22. In particular, the voltage on the VSD capacitor bank 36 can power the inverter section 28. Of course the greater the load current to be supplied to the load 22, the more energy is to be stored in the VSD capacitor bank 26 and applied to the inverter section 28 over the DC bus 29.

The inverter section 28 receives the DC bus voltage from the DC bus voltage and generates AC output waveforms received by the load 22. In one example, the inverter section 28 can include a plurality of inverters 38 that are arranged as pairs of inverters, wherein the pairs are connected in parallel with each other. The inverters 38 of each pair of inverters can include first and second diodes inverters 38 that are connected in series with each other. The inverter section 28 can include three pairs 40a, 40b, and 40c of inverters 38. Each of the pairs 40a, 40b, and 40c are connected in parallel. Each of the pairs 40a, 40b, and 40c of inverters 38 is electrically connected along a separate line to the load 22.

The variable speed drive (VSD) system 20 can also include auxiliary electrical components as desired, such as a controller, display, fault circuitry, contactors, and the like as is understood by one having ordinary skill in the art. The VSD circuit 24 further includes a control power transformer (CPT) 42 that is configured to deliver electrical power to one or more up to all of the auxiliary electrical components. The CPT 42 is electrically connected to two of the three lines of the 3-phase electrical power source 25. Thus, in one example, single-phase electrical power is input to the CPT 42 at the voltage and frequency of the electrical power source, that is 480V at 60 Hz. It is recognized that the VSD system 20 can include any number of CPTs 42 as desired. The CPT 42 can be configured as a step-down transformer that reduces the voltage with respect to the input voltage, so as to output low voltage that drives the auxiliary electrical components. While the CPT 42 can be configured to receive a 480V input, and output 120V in one example, it is recognized that the CPT 42 can be configured to output any voltage as desired dependent upon the design of the variable speed drive system 20. By way of example and not limitation, the output voltage of the CPT 42 can be in a range from approximately 50V to approximately 300V.

While the VSD system 20 is illustrated as including a single CPT 42, it is recognized that the VSD system 20 can include any number of CPTs 42 as desired, such as at least one or more CPTs 42. Each CPT 42 can be configured to supply electrical power to a dedicated one or more electrical components. Each CPT 42 can receive input line voltage from the electrical power source 25 or from its own power source.

It is recognized that a ride-through event can disable the VSD system 20. In particular, the CPT can lose electrical power, and after the VSD capacitor bank 36 has been discharged which disrupts electrical power to the load 22. This results in disruptions in operation of the load 22 and requires valuable time to restart the load once the input electrical power is resumed. Further, as described above, restarting submersible pumps can create a risk of damaging the pump.

Figure 2:
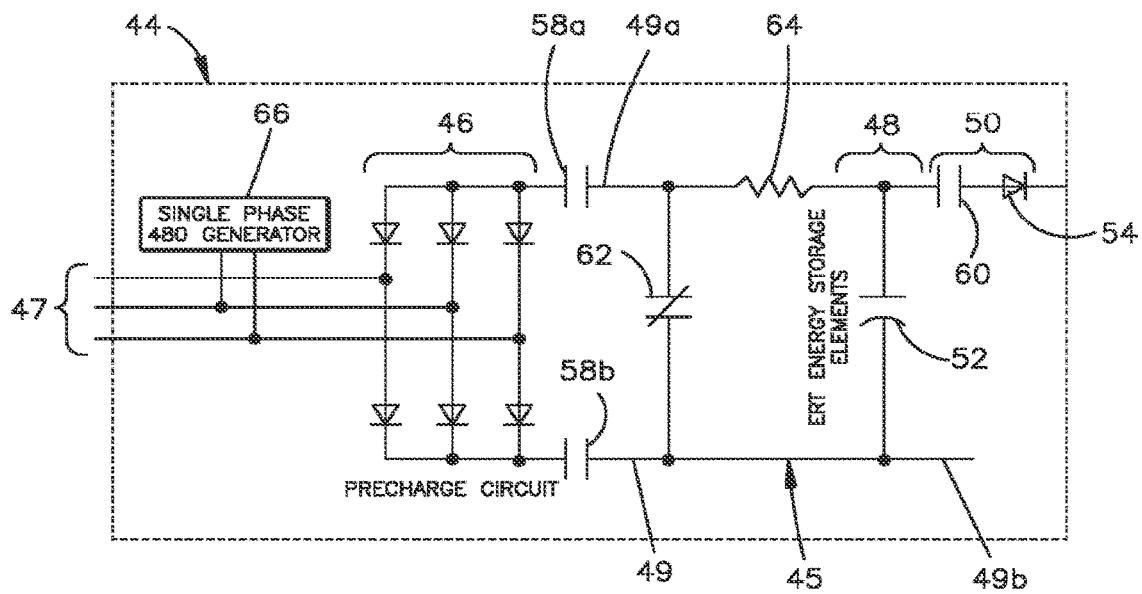
FIG. 2 is a circuit schematic diagram of an electrical ride through unit configured to deliver electrical power to a load during periods of disruption in the electrical power supply to the load.

Referring now to FIGS. 1 and 2, an electrical ride-through (ERT) unit 44 can be configured to supply sufficient electrical power to continue operation of the load 22 and can further be configured to provide electrical power to the CPT 42 in order to maintain operation of the CPT 42 and the electrical components that are powered by the CPT 42. In particular, as will now be described the ERT unit 44 can include chargeable circuitry that is configured to deliver electrical power to the VSD circuit 24 during periods of interruption in the electrical power source 25.

With continuing reference to FIG. 2, the ERT unit 44 can include an ERT circuit 45 that includes an ERT DC bus 49, and a ride-through (ERT) AC to DC converter section 46, an ERT storage section 48, and an ERT output section 50 on the ERT DC bus 49. The ERT converter section 46 is configured to receive input AC electrical power and convert the alternating current to direct current. The ERT storage section 48 is configured to store power that is to be output to the VSD circuit 24 during disruptions in the input line voltage to the VSD circuit 24. The ERT output section 50 is configured to allow current to flow from the ride-through storage section 48 to the VSD circuit 24 during instances of disruptions in the input line voltage to the VSD circuit 24, and prevent current from flowing from the ride-through energy storage section 48 to the VSD circuit 24 during normal operation (i.e., when the input line is delivering the three-phase 480 V at 60 Hz to the VSD circuit 24, and in particular to the VSD converter section 26). The ERT converter section 46, the ERT storage section 48, and the ERT output section 50 will now be described in more detail.

The ERT converter section 46 can be constructed as described above with respect to the VSD converter section 26, and thus can be configured as a plurality of diode bridges that are connected in parallel with each other between a positive line 49a of the ERT DC bus 49 and a negative line 49b of the ERT DC bus 49. Each of the diode bridges receive a voltage input from a respective one of the phases of input line voltage. Thus, the ERT converter section 46 is configured to receive a 3-phase electrical input line voltage from any suitable power source 47, such as the electrical power grid, rectify the AC line voltage, and output a single-phase DC bus voltage to the ERT DC bus 49. The line voltage can be a typical 480 volt (V) three phase input at 60 Hz.

The ERT storage section 48 is on the ERT DC bus 49 and can be connected in parallel with the ERT converter section 46 between the positive line 49a and the negative line 49b. The ERT storage section 48 can include an ERT capacitor bank 52 that is configured to receive and store the single-phase DC bus voltage output from the ERT converter section 46.

The ERT capacitor bank 52 can be provided as a single DC capacitor or a plurality of DC capacitors as desired. The single-phase DC bus voltage output by the ERT converter section 46 onto the ERT DC bus 49 charges the ERT capacitor bank 52 to a desired voltage.

The ERT capacitor bank 52 can have any suitable capacitance as desired. In one example, the capacitance of the ERT capacitor bank 52 is greater than the capacitance of the VSD capacitor bank 36. In particular, the capacitance of the ERT capacitor bank 52 is designed to deliver sufficient energy to the VSD circuit 24 over a predetermined duration of time that is deemed suitable to power the drive 20 during momentary power outages in the line voltage input to the VSD circuit 24. In one example, the ERT capacitor bank 52 can have at least one or more supercapacitors. By way of example and not limitation, the ERT capacitor bank 52 can have a capacitance in a range from than approximately 1 Farad (F) to approximately 50 F. In one particular example, the capacitance of the ERT capacitor bank 52 can be approximately 11 F.

Figure 3:
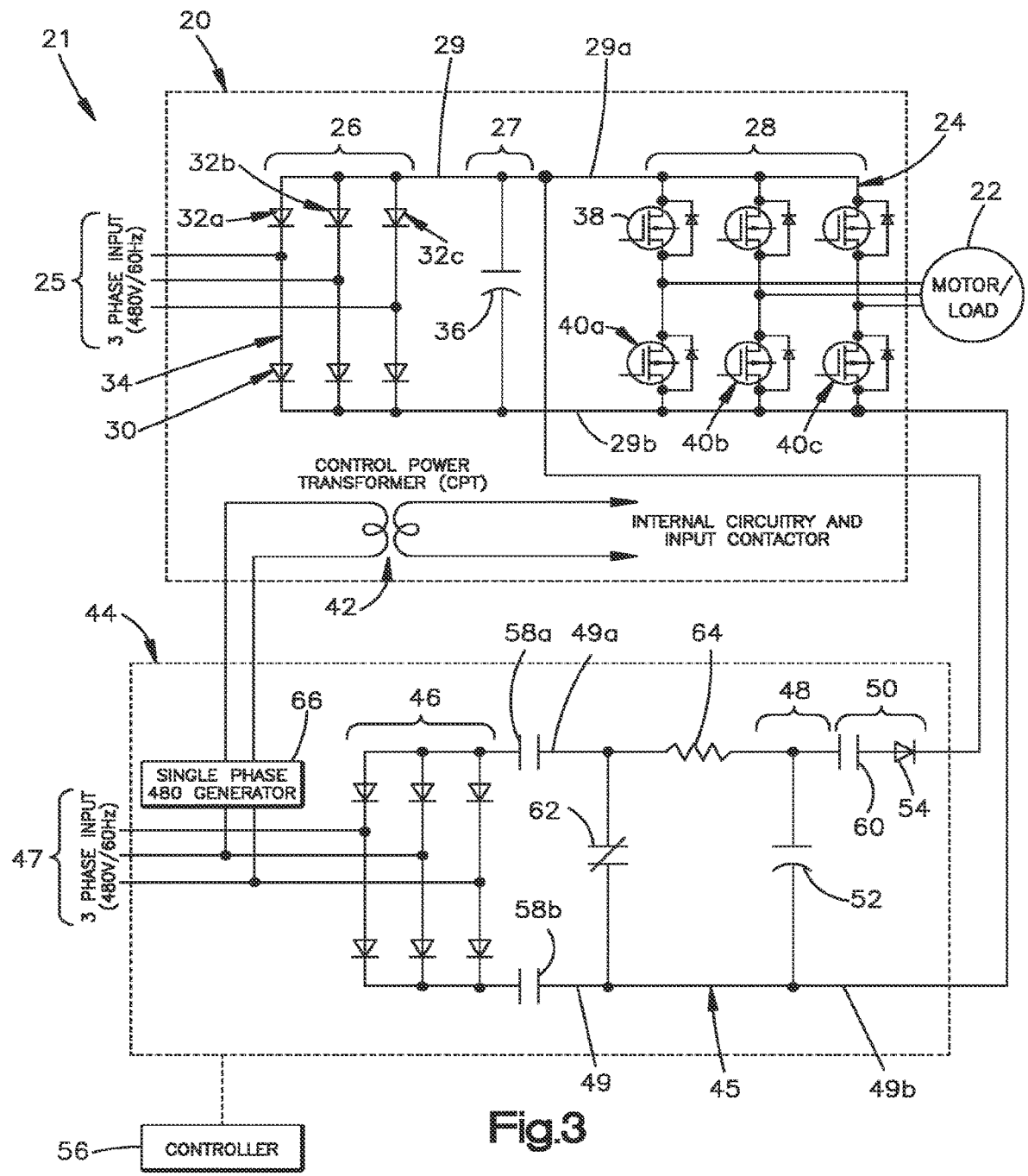
FIG. 3 is a circuit schematic diagram of an electrical control system including the electrical ride through unit of the type illustrated in FIG. 2 integrated into a variable speed drive of the type illustrated in FIG. 1.

Referring now also to FIG. 3, an electrical drive system 21 can include the VSD system 20 and the ERT unit 44 integrated into the VSD system. For instance, the ERT circuit 56 can be integrated into the VSD circuit. In one example, the ERT output section 50 can be configured to allow current to flow from the ERT capacitor bank 52 to the VSD DC bus 29 only during a disruption of the line voltage to the VSD DC bus 29. In one example, the output section 50 includes at least one ERT output diode 54 on the positive line 49a that is forward biased toward the positive line 29a of the VSD DC bus 29. The positive line 49a of the ERT DC bus 49 is connected from the ERT output diode 54 to the positive line 29a of the VSD DC bus 29. The negative line 49b of the ERT DC bus 49 is connected to the negative line 29b of the VSD DC bus 29.

When the voltage on the VSD DC bus 29 is greater than the voltage of the charged ERT capacitor bank 52, as is the case during normal operation, the ERT output diode 54 is configured to prevent the ERT capacitor bank 52 from conducting. When the voltage on the VSD DC bus 29 is less than the voltage of the charged ERT capacitor bank 52, as is the case during an interruption of voltage on the line input to the VSD DC bus 29, the ERT output diode 54 is configured to allow the ERT capacitor bank 52 to conduct to the positive line 29a of the VSD DC bus 29.

With continuing reference to FIG. 3, the ERT unit 44 can further include a controller 56 that governs the operation of the ERT circuit 45. For instance, the ERT circuit 45 includes a first charging contactor 58a on the positive line 49a of the ERT DC bus 49 between the ERT converter section 46 and the ERT storage section 48, and a second charging contactor 58b on the negative line 49b of the ERT DC bus 49 between the ERT converter section 46 and the ERT storage section 48. When the charging contactors 58a and 58b are closed, the ERT capacitor bank 52 is placed in electrical communication with the ERT converter section 46.

When the charging contactors 58a and 58b are open, the ERT capacitor bank 52 is electrically decoupled from the ERT converter section 46.

The ERT circuit 45 includes an output contactor 60 on the positive line 49a of the ERT DC bus downstream of the ERT output diode 54 with respect to the direction of current flow. The output contactor 60 is further electrically connected to the positive line 29a of the VSD DC bus 29 at a location between the VSD capacitor bank 36 and the VSD inverters 38. When the output contactor 60 is closed, the cathode side of the ERT capacitor bank 52 is electrically connected to the inverters 38. When the output contactor 60 is open, the cathode side of the ERT capacitor bank 52 is electrically decoupled from the VSD DC bus 29, and in particular the inverters 38.

The ERT circuit 45 further includes a discharge contactor 62 electrically connected between the positive line 49a and the negative line 49b of the ERT DC bus 49. The discharge contactor 62 is thus connected in parallel with the ERT capacitor bank 52. The ERT circuit 45 further includes a resistor 64 on the positive line 49a of the ERT DC bus 49 between the discharge contactor 62 and the ERT capacitor bank 52.

The controller 56 is configured to control the first and second charging contactors 58a and 58b, the output contactor 60, and the discharge contactor 62 so as to iterate the ERT circuit 45, and thus the ERT unit 44, between a charging mode, a ride-through mode, and a discharge mode. The charging mode, the ride-through mode, and the discharge mode will now be described in more detail.

With continuing reference to FIG. 3, the ERT circuit 45, and thus the ERT unit 44, is in charging mode when the charging contactors 58a and 58b are closed. The ERT circuit 45, and thus the ERT unit 44, exit charging mode when the charging contactors 58a and 58b are open. Thus, the ERT circuit is configured to selectively couple the ERT storage section 48 to the ERT converter section 46 during the charging mode and decouple the ERT storage section 48 from the ERT converter section 46 when charging of the ERT storage section 48 is completed. When the ERT unit 44 is in the charging mode, the single-phase DC voltage on the ERT DC bus 49 is delivered to the ERT capacitor bank 52, thereby charging the ERT capacitor bank 52.

Further, the output contactor 60 and the discharge contactor 62 can both be open during charging mode. When the charging mode has been completed, electrical power is no longer delivered from the ERT converter section 46 to the ERT storage section 48.

The ERT capacitor bank 52 is charged substantially to a target voltage that is no greater than the voltage on the VSD DC bus 29 that is applied to the load 22 during normal operation (also referred to as operating voltage). For instance, the target voltage can be no greater than, such as less than, the operating voltage of the VSD DC bus 29, but sufficient to continue operation of the load 22 during voltage disruptions on the VSD DC bus 29. In one example, the target voltage can be in a range from approximately 50% of the operating voltage of the VSD DC bus 29 to approximately 99% of the operating voltage of the VSD DC bus 29. For instance, the target voltage can be in a range from approximately 80% of the operating voltage of the VSD DC bus 29 to approximately 99% of the operating voltage of the VSD DC bus 29. In particular, the target voltage can be approximately 95% of the operating voltage of the VSD DC bus 29. The resistor 64 can limit peak charging current during charging of the ERT capacitor bank 52. The resistor 64 can have any suitable resistance as desired, sufficient to charge the ERT capacitor bank 52 in a suitable amount of time while maintaining the maximum current on the ERT DC bus 49 as desired. For instance, in some instances, it may be desirable to limit the peak charging current to approximately 20 A or less. In one example, the resistance of the resistor 64 can be in a range from approximately 6 ohms to approximately 15 ohms. It is appreciated, of course, that the peak charging current and the resistance of the resistor 64 are design variables that can be adjusted as desired.

After the ERT capacitor bank 52 has substantially reached the target voltage, the ERT circuit 45 can discontinue charging mode by opening the first and second charging contactors 58a-58b. The controller 56 closes the ride-through contactor 60 to enter ride-through mode. The charging contactors 58a and 58b and the discharge contactor 62 can be open during ride-through mode. In ride-through mode, the cathode of the ERT capacitor bank 52 is electrically connected to the positive side of the VSD inverters 38 through the closed ride-through contactor 60. Because the voltage on the VSD DC bus 29 during normal operation is greater than the voltage of the charged ERT capacitor bank 52, the ERT output diode 54 is not electrically conductive, which prevents the ERT capacitor bank 52 from conducting energy to the VSD DC bus 29.

However, when an electrical power disruption occurs on the line voltage input to the VSD circuit 24, the VSD capacitor bank 36 discharges, and the voltage on the VSD DC bus 29 falls to a level below the voltage of the charged ERT capacitor bank 52. As a result, the ERT output diode 54 becomes electrically conductive, and current flows from the ERT output diode 54 through the ERT output diode 54 to the positive line 29a of the VSD DC bus 29, and thus to the VSD inverters 38. The inverters 38 then apply electrical power to the load 22 in the manner described above. Because the voltage supplied to the load 22 does approach zero due to the voltage supply from the ERT capacitor bank 52, the load 22 does not discontinue operation in response to the disruption of input voltage. It is further recognized that the voltage applied to the load 22 from the ERT capacitor bank 52 is less than the voltage applied to the load 22 during normal operation, the load 22 may not operate at full capacity. However, because the target voltage of the ERT capacitor bank 52 is only slightly less than the voltage applied to the load 22 during normal operation, the load 22 can operate at levels close to full capacity. Further, because the load 22 does not shut down, it does not require restarting upon resumption of the line voltage input to the VSD circuit 24.

Once the disruption to the line voltage input to the VSD circuit 24 has ended and normal operation has resumed, the voltage on the VSD DC bus 29 increases to a level greater than the voltage applied to the DC bus 29 from the ERT capacitor bank 52. As a result, the ERT output diode 54 becomes electrically nonconductive, and electrical current no longer flows from the ERT capacitor bank 52 to the VSD circuit 24. The ERT circuit 45 can then enter charging mode to once again charge the ERT capacitor bank 52 to the target voltage. It is expected that the capacitance of the ERT capacitor bank 52 is sufficient to drive the VSD circuit 24 for a period of time that is sufficient to endure periods of disruptions to the power supply to the VSD circuit 24. In this regard, the ERT capacitor bank 52 can have any suitable capacitance as desired, that is deemed suitable to allow the load 22 to ride through disruptions in the power supply of the VSD circuit 24.

With continuing reference to FIG. 3, the discharge mode allows the ERT capacitor bank 52 to discharge its stored energy, for instance when the VSD system 20 is not in operation. When the discharge contactor 62 is closed and the charging contactors 58a and 58b are open, the ERT unit is in discharge mode. During discharge mode, the ERT DC bus 49 defines a closed loop that includes the ERT capacitor bank 52 and the resistor 64 connected in series with the ERT capacitor bank 52, thereby allowing the ERT capacitor bank 52 to discharge its stored energy. The resistor 64 can limit the electrical current as the ERT capacitor bank is discharged. The output contactor 60 can also be open in discharge mode to electrically decouple the ERT capacitor bank 52 from the VSD circuit 24 while the energy from the ERT capacitor bank 52 discharges its stored energy.

Any of the contactors 58a-58b, 60, and 62 can be normally open or normally closed as desired. In one example, electrical ride-through circuit 45 is normally in discharge mode. Thus, the charging contactors 58a and 58b and the output contactor 60 are normally open to decouple the ERT capacitor bank 52 from the ERT converter section 46 and the VSD circuit 24, and the discharge contactor 62 is normally closed so that the ERT capacitor bank 52 discharges its stored energy. When the discharge contactor 62 is open, the discharge contactor prevents the capacitor bank 52 from discharging its stored energy on the ERT circuit 45. The ERT capacitor bank 52 is therefore only able to discharge its stored energy when it applies a voltage onto the VSD DC bus 29.

With continuing reference to FIG. 3, the ERT circuit 45 can include an electrical generator 66 that receives single-phase line voltage from a respective electrical power source, which can be defined by the power source 47 that drives the ERT circuit 45, or its own dedicated electrical power source. The electrical generator 66 can be configured to receive, and output, single-phase electrical power at 480V at 60 Hz. Thus, during periods of electrical power disruption, the CPT 42 is driven by the electrical power received from the electrical generator 66. Accordingly, the CPT can output the voltage that drives the auxiliary electrical components in the manner described above. During normal operation, the CPT 42 can receive line input through the generator 66.

Thus, the ERT unit 44, and in particular the electrical generator 66, can supply electrical power to the CPT 42 to maintain operation of the CPT 42 during periods of disruption in the line voltage input to the VSD circuit 24. It is appreciated that any suitable alternative electrical device can supply electrical power to the CPT 42 as desired. Other embodiments are envisioned to provide electrical power to the auxiliary electrical components of the VSD system 20. For instance, the ERT unit 44, and in particular the generator 66 or alternative device, can alternatively supply electrical power directly to the auxiliary electrical components during a disruption in line voltage input to the VSD circuit 24. Of course, it may be desirable to disconnect the CPT 42 from the three-phase input during periods of disruption in the line voltage to prevent voltage spikes to the auxiliary electrical components when the disruption in line voltage has ended. Thus, a contactor can be opened and closed as desired to control the connection from the line voltage to the CPT 42. Whether the generator 66 supplies power to the CPT 42 or directly to the auxiliary electrical components, it can be said that the generator supplies voltage that powers the auxiliary electrical components.

Operation of the ERT unit 44 will now be described with reference generally to FIGS. 3-4D. Operation of the ERT unit 44 can be performed by the controller 56, which can be defined by one or more components, including sensors, or the like that operate a stored program in volatile or non-volatile memory. It should be appreciated that while FIGS. 4A-4D show certain steps associated with various modes of operation, the present disclosure is not limited to the steps illustrated, nor is the present disclosure limited to performing all of the steps illustrated. Further, it is recognized that some of the steps can be performed in a different order than the order illustrated.

Figure 4A:
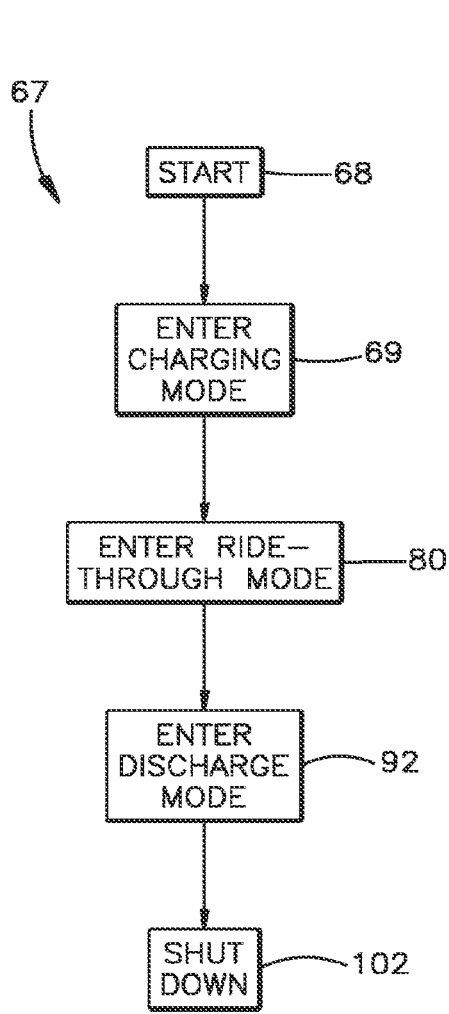
FIG. 4A is a flowchart showing steps associated with operation of the electrical ride-through unit in one example.

Referring initially to FIGS. 3 and 4A, a method 67 for operating the ERT unit 44 can be initiated at a starting step 68, whereby the controller 56 is activated. The ERT circuit 45 can initially be in discharge mode upon initiation of the controller, due to the normally open charging contactors 58a and 58b and output contactor 60, and normally closed discharge contactor 62. The controller begins at step 68 by initiating charging mode 70 at step 69.

Figure 4B:
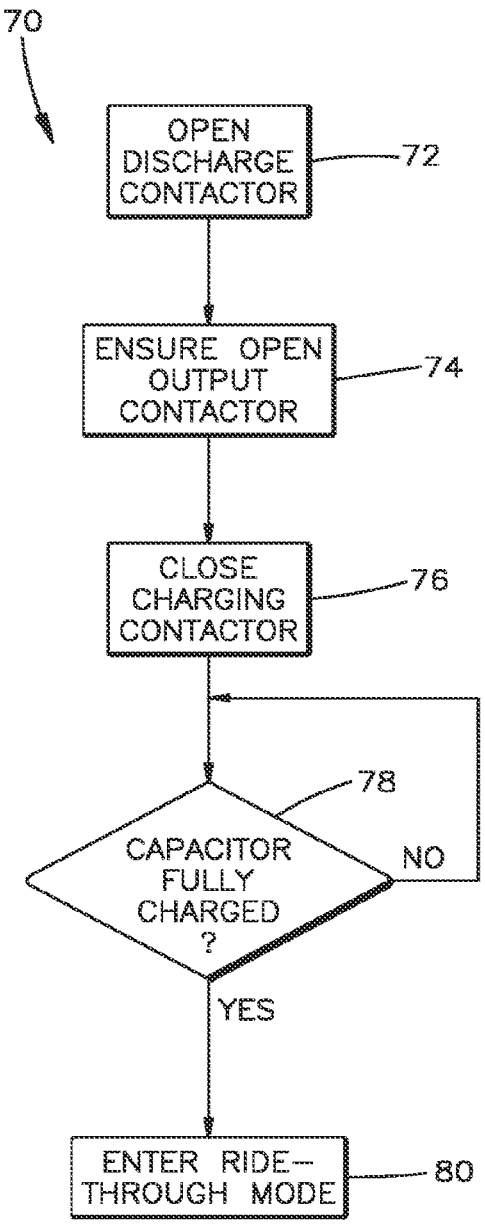
FIG. 4B is a flowchart showing steps associated with a charging mode of the electrical ride-through unit.

In particular, referring to FIGS. 3 and FIGS. 4A-4B, when the ERT circuit 45 enters charging mode 70, the controller 56 opens the discharge contactor 62 at step 72 if the discharge contactor 62 is closed. If the discharge contactor 62 is normally open, then the controller 56 ensures that the discharge contactor 62 is open at step 72. Next, at step 74, the controller 56 ensures that the output contactor 60 is open. If the output contactor 60 is closed, the controller 56 opens the output contactor 60 at step 74. At step 76, the controller 56 closes the charging contactor 62. If the charging contactor 62 was already open, then the controller 56 ensures that the charging contactor 62 is closed. At decision block 78, the controller determines whether the ERT capacitor bank 52 has been charged to its capacity at the target voltage. If not, the charging contactor 62 remains closed until it is determined that the ERT capacitor bank 52 has been charged to its capacity approximately at the target voltage, at which point the controller 56 iterates the ERT circuit 45 to ride-through mode at step 80.

Referring now to FIGS. 3, 4A, and 4C, ride-through mode 82 begins at step 84, whereby the controller 56 opens the charging contactors 58a-58b. Alternatively, if the charging contactors 58a-58b were already open, then the controller 56 ensures that the charging contactors 58a-58b are open at step 84. Next, at step 86, the controller 56 ensures that the discharge contactor 62 is open. Alternatively, if the discharge contactor 62 is closed, then the controller 56 opens the discharge contactor 62 at step 86. Next, at step 88, the controller closes the output contactor 60. Alternatively, if the output contactor 60 was already closed, then the controller 56 ensures that the output contactor 60 is closed at step 88.

It is recognized the VSD circuit 24 may undergo periods of line voltage disruption while the ERT capacitor bank 52 is in ride-through mode 82. The controller 56 can further operate the generator 66 to supply power to the CPT 42 when a power outage is sensed. By way of example, the power outage can be sensed by dissipation of the energy stored in the ERT capacitor bank 52 or can be sensed at the electrical power grid. It is further recognized that the ERT capacitor bank can dissipate energy during the ride-through mode 82. For instance, when the VSD circuit 24 experiences a power disruption, the ERT capacitor bank 52 applies a voltage to the VSD circuit 24 in the manner described above to continue operation of the load 22. This causes the energy stored in the ERT capacitor bank 52 to fall. Further, the ERT capacitor bank 52 can supply power to the controller 56 and other electrically powered components of the ERT unit 44. In particular, the ERT circuit 45 can include a DC-to-DC converter that uses energy stored in the ERT capacitor bank 52 to provide voltage levels that drive the controller and other electrically powered components of the ERT unit 44. This can also cause the energy stored in the ERT capacitor bank 52 to fall. In another example, the ERT capacitor bank 52 can slowly discharge over time during normal operation, which causes its stored energy to fall. Once the stored energy in the ERT capacitor bank 52 has fallen to a threshold level that warrants recharging of the ERT capacitor bank 52, the ERT controller 56 can iterate the ride-through circuit 45 to charging mode 70 (see FIG. 4B) at step 90 in the manner described above after the electrical power input has been restored to the VSD circuit 24.

At step 92 shown in FIG. 4A, the controller 56 can iterate the ERT circuit to discharge mode 94, as will now be described with reference to FIGS. 3, 4A, and 4D. In particular, it may be desired to discharge the ERT capacitor bank 52 when shutting down the ERT unit 44. Alternatively it may be desirable to discharge the ERT capacitor bank 52 when performing maintenance. Discharge mode 94 begins at step 96 whereby the controller 56 ensures that the charging contactors 58a and 58b are open. If the charging contactors 58a and 58b were closed, the controller 56 opens the charging contactors 58a and 58b at step 96. Next, at step 98, the controller 56 opens the output contactor 60. Alternatively, if the output contactor 60 was already open, then the controller 56 ensures that the output contactor 60 is open at step 98. Next, at step 100, the controller 56 closes the discharge contactor 62. Alternatively, if the discharge contactor 62 was already closed, then the controller ensures that the discharge contactor 62 is closed. Once the ERT capacitor bank 52 has been discharged, maintenance can be performed or operation of the ERT unit 44 can be discontinued at shut down step 102.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A unit used with a drive circuit, the drive circuit connected to a line voltage input and configured to drive a motor, the drive circuit having a positive drive line and a negative drive line for direct current (DC), the unit comprising:
    an electrical ride-through (ERT) circuit having a positive ERT line and a negative ERT line, the negative ERT line in electrical communication with the negative drive line, the ERT circuit in a first condition being configured to selectively decouple the positive ERT line from the positive drive line, the ERT circuit in a second condition being configured to selectively couple the positive ERT line with the positive drive line in response to a disruption of the line voltage input;
    an energy storage section connected between the positive and negative ERT lines, the energy storage section configured to selectively store and discharge stored energy; and
    an output diode disposed on the positive ERT line, the output diode being configured to prevent electrical current flow from the drive to the ERT circuit when a drive voltage level of the drive circuit is greater than a storage voltage level of the energy storage section, the output diode being configured to permit the electrical current flow from the ERT circuit to the drive when the drive voltage level is less than the storage voltage level.

2. The unit of claim 1, wherein the energy storage section comprises a capacitor.

3. The unit of claim 1, further comprising an electrical generator that is configured to supply auxiliary voltage to power auxiliary electrical components for the drive circuit.

4. The unit of claim 1, further comprising an output contactor disposed on the positive ERT line, the output diode disposed between the output contactor and the positive drive line of the drive circuit.

5. The unit of claim 4, wherein the output contactor is configured to iterate between:
    an opened state for the ERT circuit in the first condition, whereby the energy storage section is electrically disconnected from the drive circuit; and
    a closed state for the ERT circuit in the second condition, whereby the energy storage section is electrically connected to the drive circuit through the output diode.

6. The unit of claim 4, further comprising a converter section that receives a three-phase line voltage and converts the three-phase line voltage to a single-phase DC voltage that charges the energy storage section.

7. The unit of claim 6, further comprising at least one charging contactor disposed on the ERT circuit between the converter section and the energy storage section, wherein the at least one charging contactor is movable between:
    an opened position, whereby the energy storage section is electrically disconnected from the converter section; and
    a closed position, whereby the energy storage section receives the single-phase DC voltage from the converter section.

8. The unit of claim 7, further comprising a discharge contactor connected between the positive and negative ERT lines, wherein the discharge contactor is disposed between the converter section and the energy storage section, and wherein the discharge contactor is movable between:
    a closed position configured to cause the energy storage section to discharge the stored energy, and
    an opened position configured to prevent the energy storage section from discharging the stored energy.

9. The unit of claim 8, further comprising a resistor disposed on the positive ERT line of the ERT circuit, the resistor connected in series with the discharge contactor and the energy storage section.

10. The unit of claim 8, wherein the discharge contactor is normally closed, the at least one charging contactor is normally open, and the output contactor is normally open.

11. The unit of claim 8, further comprising a controller configured to control the at least one charging contactor, the output contactor, and the discharge contactor to iterate the ERT circuit between a charging mode for the first condition, a ride-through mode for the second condition, and a discharge mode for the second condition; wherein the ERT circuit in the charging mode has the at least one charging contactor closed, the discharge contactor open, and the output contactor open; wherein the ERT circuit in the ride-through mode has the at least one charging contactor open, the discharge contactor open, and the output contactor closed; and wherein the ERT circuit in the discharge mode has the at least one charging contactor open, the discharge contactor closed, and the output contactor open.

12. A drive system for a motor, the drive system comprising:
    a drive circuit connected to a line voltage input and configured to drive the motor, the drive circuit having a positive drive line and a negative drive line for direct current (DC); and
    a unit used with the drive circuit and having:
        an electrical ride-through (ERT) circuit having a positive ERT line and a negative ERT line, the negative ERT line in electrical communication with the negative drive line, the ERT circuit in a first condition being configured to selectively decouple the positive ERT line from the positive drive line, the ERT circuit in a second condition being configured to selectively couple the positive ERT line with the positive drive line in response to a disruption of the line voltage input;
        an energy storage section connected between the positive and negative ERT lines, the energy storage section configured to selectively store and discharge stored energy; and
        an output diode disposed on the positive ERT line, the output diode being configured to prevent electrical current flow from the drive to the ERT circuit when a drive voltage level of the drive circuit is greater than a storage voltage level of the energy storage section, the output diode being configured to permit the electrical current flow from the ERT circuit to the drive when the drive voltage level is less than the storage voltage level.

13. The drive system of claim 12, wherein the energy storage section is charged to a voltage less than a voltage that is applied to the motor for the drive circuit.

14. A method used with a drive circuit, the drive circuit connected to a line voltage input and configured to drive a motor, the method comprising:
    driving the motor at an operating voltage using a line voltage input to the drive circuit;

charging an energy storage section of an electrical ride-through (ERT) circuit in a first condition to a target voltage that is less than the operating voltage, the ERT circuit in the first condition decoupled from the drive circuit; and in response to a disruption of the line voltage input, selectively changing the ERT circuit from the first condition to a second condition by:

coupling the ERT circuit to the drive circuit;

preventing electrical current from flowing between the energy storage section and the drive circuit in response to the target voltage being less than a level of the operating voltage of the drive circuit; and permitting electrical current to flow from the energy storage section to the drive circuit in response to a voltage drop on the drive circuit making the level of the operating voltage less than the target voltage.

15. The method of claim 14, wherein charging the energy storage section of the ERT circuit in the first condition comprises operating the ERT circuit in a charging mode by:

closing a charging contactor disposed between a converter section of the ERT circuit and the energy storage section; and opening an output contactor disposed between the energy storage section and the drive circuit.

16. The method of claim 15, further comprising iterating the ERT circuit from the charging mode to a ride-through mode by closing the output contactor, and opening the charging contactor.

17. The method of claim 16, further comprising iterating the ERT circuit from the ride-through mode to the charging mode after electrical current has flowed from the energy storage section to the drive circuit.

18. The method of claim 16, further comprising iterating the ERT circuit from the ride-through mode to a discharge mode by:

opening the output contactor;

opening the charging contactor; and permitting energy to be discharged from the energy storage section to the drive circuit by closing a discharge contactor of the ERT circuit.

19. The method of claim 18, further comprising causing electrical current from the energy storage section to flow through a resistor as the energy storage section is discharged.

20. The method of claim 14, further comprising powering auxiliary electrical components of the drive circuit with a generator on the ERT circuit during the disruption of line voltage input to the drive circuit.

* * * * *